United States Patent
de Richebourg et al.

(10) Patent No.: US 9,582,848 B2
(45) Date of Patent: Feb. 28, 2017

(54) SPRITE GRAPHICS RENDERING SYSTEM

(71) Applicant: Apple Inc., Cupertino, CA (US)

(72) Inventors: Jacques P. Gasselin de Richebourg, Sunnyvale, CA (US); Norman N. Wang, San Jose, CA (US); Timothy R. Oriol, Cupertino, CA (US); Geoffrey G. Stahl, San Jose, CA (US)

(73) Assignee: Apple Inc., Cupertino, CA (US)

( * ) Notice: Subject to any disclaimer, the term of this patent is extended or adjusted under 35 U.S.C. 154(b) by 519 days.

(21) Appl. No.: 14/063,970

(22) Filed: Oct. 25, 2013

(65) Prior Publication Data

US 2014/0184606 A1   Jul. 3, 2014

Related U.S. Application Data

(60) Provisional application No. 61/746,678, filed on Dec. 28, 2012.

(51) Int. Cl.
| | | |
|---|---|---|
| *G06T 1/60* | (2006.01) | |
| *G06T 15/00* | (2011.01) | |
| *G06T 15/04* | (2011.01) | |

(52) U.S. Cl.
CPC .............. *G06T 1/60* (2013.01); *G06T 15/005* (2013.01); *G06T 15/04* (2013.01); *G06T 2210/61* (2013.01)

(58) Field of Classification Search
CPC .......... G06T 15/04; G06T 11/001; G06T 1/60
See application file for complete search history.

(56) References Cited

U.S. PATENT DOCUMENTS

| | | |
|---|---|---|
| 5,982,939 A | 11/1999 | VanHook |
| 6,373,482 B1 | 4/2002 | Migdel |
| 8,204,338 B2 | 6/2012 | Hoppe |
| 8,855,410 B2 | 10/2014 | Fenney |
| 2003/0011637 A1 | 1/2003 | Boudier |
| 2005/0030317 A1* | 2/2005 | Spicer ................... G06T 11/001 345/582 |
| 2006/0170695 A1 | 8/2006 | Zhou |
| 2006/0256126 A1 | 11/2006 | Lin |
| 2006/0284880 A1 | 12/2006 | Zhou |
| 2008/0094411 A1 | 4/2008 | Parenteau |
| 2011/0148894 A1* | 6/2011 | Duprat ................... G06T 11/001 345/552 |

(Continued)

FOREIGN PATENT DOCUMENTS

| | | |
|---|---|---|
| JP | 4521167 B2 | 5/2010 |
| KR | 1020040106300 A | 12/2004 |

OTHER PUBLICATIONS

Haegler, "Grammar-based Encoding of Facades", Eurographics Symposium on Rendering 2010, p. 1.*

(Continued)

*Primary Examiner* — Maurice L McDowell, Jr.
(74) *Attorney, Agent, or Firm* — Blank Rome LLP

(57) ABSTRACT

A set of tools, in the form of a software developers kit (SDK) for a graphics rendering system, is provided to improve overall graphics operations. In general, the tools are directed to analyzing a scene tree and optimizing its presentation to one or more graphics processing units (GPUs) so as to improve rendering operations. This overall goal is provided through a number of different capabilities, each of which is presented to software developers through a new applications programming interface (API).

20 Claims, 12 Drawing Sheets

(56) References Cited

U.S. PATENT DOCUMENTS

| | | | |
|---|---|---|---|
| 2013/0016112 A1 | 1/2013 | Burley | |
| 2013/0051701 A1 | 2/2013 | Bloomfield | |
| 2013/0286025 A1 | 10/2013 | Spells | |
| 2013/0321453 A1* | 12/2013 | Fink | G06F 9/5016 345/629 |
| 2014/0152683 A1* | 6/2014 | Nystad | G06T 15/04 345/582 |
| 2014/0267346 A1 | 9/2014 | Ren | |
| 2014/0333621 A1 | 11/2014 | Hillesland | |

OTHER PUBLICATIONS

Gamma correction—Wikipedia, the free encyclopedia, https://web.archive.org/web/20130801093657/http://en.wikipedia.org/wiki/Gamma_correction, version Aug. 1, 2013.
Matthias Trapp & Jurgen Dolinery, "Interactive Rendering to View-Dependent Texture-Atlases," Eurographics 2010.
Mengmeng Zhang, Qianqian Li, Lei Li, and Peirui Bai, "An improved algorithm based on the gvf-snake for effective concavity edge detection," Software Engineering and Applications, 2013.
Poynton, C., 'The Rehabilitation of Gamma', SPIE Conf., Human Vision and Electronic Imaging III, vol. 3299, pp. 232-249 (1998).
Andersson, S., et al., "Virtual Texturing with WebGL," Chalmers University of Technology—Gothenburg, Sweden, Jan. 2012.
Aliaga D et al: "MMR: An Interactive Massive Model Rendering System Using Geometric and Image-Based Acceleration", Proceedings of the 1999 Symposium on Interactive 3D Graphics. Atlanta, GA, Apr. 26-28, 1999; [Proceedings of the Symposium on Interactive 3D Graphics], New York, NY: ACM, US, Apr. 26, 1999 (Apr. 26, 1999), pp. 199-206, 237, XP01032569, ISBN: 978-1-58113-082-9.
Durbin J. et al: "Amortizing 3D Graphics Optimization Across Multiple Frames", UIST '95. 8th Annual Symposium on User Interface Software and Technology. Proceedings of the ACM Symposium on User Interface Software and Technology. Pittsburgh, PA, Nov. 14-17, 1995; [ACM Symposium on User Interface Software and Technology], New York, NY, Nov. 14, 1995 (Nov. 14, 1995), pp. 13-19, XP000634410, DOI: 10.1145/215585.215633, ISBN.
Gobbeti E. et al: "Technical strategies for massive model visualization", ACM SIGGRAPH Asia 2008 Courses, SIGGRAPH Asia '08 2008 Association for Computing Machinery USA, Jun. 2, 2008 (Jun. 2, 2008), pp. 405-415, XP002634823, DOI: 10.1145/1508044.1508073.
H. Buchholz et al: "View-Dependent Rendering of Multiresolution Texture-Atlases", VIS 05. IEEE Visualization, 2005, Oct. 2005 (Oct. 2005), pp. 215-222, XP055102974, DOI: 10.1109/VISUAL.2005.1532798, ISBN: 978-0-78-039462-9.
Igehy H. et al: "Prefetching in a Texture Cache Architecture", Proceedings of the 1998 Eurographics/SIGGRAPH Workshop on Graphics Hardware. Lisbon, Aug. 31-Sep. 1, 1998; [Eurographics/SIGGRAPH Workshop on Graphics Hardware] New York, NY: ACM, US. vol. Workshop 2, Aug. 31, 1998 (Aug. 31, 1998), pp. 133-142, XP001017001, ISBN: 978-1-58113-097-3.
Martin Kada et al: "Real-Time Visualisation of Urban Landscapes Using Open-Source Software", 2003, pp. 1-4, SP055102973, Retrieved from the Internet: URL: http://w0064806.dd6812.kasserver.com/papers/IMPOSTOR.PDF [retrieved on Feb. 18, 2014].
Torborg J et al: "Talisman: Commodity Realtime 3D Graphics for the PC", Computer Graphics Proceedings 1996 (SIGGRAPH). New Orleans, Aug. 4-9, 1996; [Computer Graphics Proceedings (SIGGRAPH)], New York, NY: ACM, US, Aug. 4, 1996 (Aug. 4, 1996, pp. 353-363, XP000682751.

* cited by examiner

SPRITE GRAPHICS RENDERING SYSTEM

BACKGROUND

This disclosure relates generally to the field of computer graphics. More particularly, but not by way of limitation, it relates to technique for manipulating sprites in a rendering system for use with a graphics processor unit (GPU).

A sprite is a two-dimensional (2D) image or animation that is integrated into a larger scene. Sprites can be mapped into three-dimensional (3D) scenes. Sprites may be created from any source, including pre-rendered imagery, dynamic 3D graphics, vector art, and even text. As graphics processor units (GPUs) have become available, libraries of sprites and graphic processing routines have been developed to provide a rendering system that allows use of the power of GPUs for faster rendering of graphics instead of depending entirely on the processing power of common central processing units (CPUs). Generally both CPUs and GPUs are involved in graphics processing operations provided by these libraries, with much of the graphics processing handled by the GPUs.

These rendering systems typically represent graphics operations in a scene tree. The scene graph is a structure that arranges the logical and often (but not necessarily) spatial representation of a graphical scene. A scene graph is a collection of nodes in a graph or tree structure. A node may have many children but often only a single parent, with the effect of a parent applied to all its child nodes. An operation performed on a group automatically propagates its effect to all of its members. A common feature is the ability to group related shapes/objects into a compound object that can then be moved, transformed, selected, etc. as easily as a single object.

SUMMARY

A set of tools, in the form of a software developers kit (SDK) for a graphics rendering system, is provided to improve overall graphics operations. In general, the tools are directed to analyzing a scene tree and optimizing its presentation to one or more graphics processing units (GPUs) so as to improve rendering operations. This overall goal is provided through a number of different capabilities, each of which is presented to software developers through a new applications programming interface (API).

DETAILED DESCRIPTION

Figure 1:
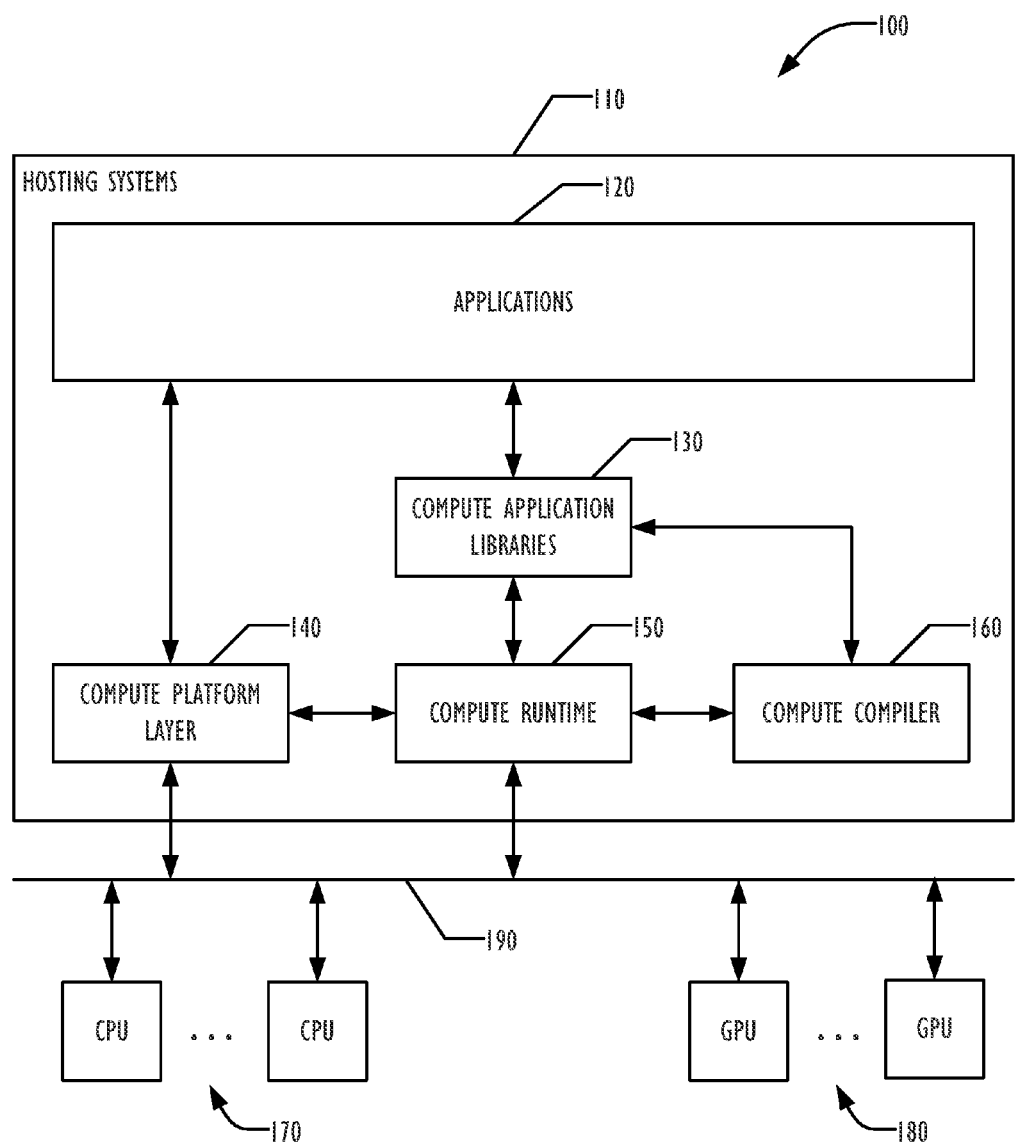
FIG. 1 is a block diagram illustrating one embodiment of a graphics rendering system.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

The processes depicted in the figures that follow are performed by processing logic that comprises hardware (e.g., circuitry, dedicated logic, etc.), software (such as is run on a general purpose computer or a dedicated machine), or a combination of both. Although the processes are described below in terms of some sequential operations, some of the operations described may be performed in different order, and some operations may be performed in parallel rather than sequentially.

A Graphics Processing Unit (GPU) may be a dedicated graphics processor implementing highly efficient graphics operations, such as 2D, 3D graphics operations and/or digital video related functions. A GPU may include special (programmable) hardware to perform graphics operations, e.g., blitter operations, texture mapping, polygon rendering, pixel shading, and vertex shading. GPUs are known to fetch data from a frame buffer and blend pixels together to render an image back into the frame buffer for display. GPUs may also control the frame buffer and allow the frame buffer to be used to refresh a display, such as a CRT or LCD display. Conventionally, GPUs may take graphics processing tasks from one or more central processing units (CPUs) coupled with the GPUs to output raster graphics images to display devices through display controllers.

A typical GPU is typically a Single Instruction Multiple Data (SIMD) device in which each instruction may operate on multiple pieces of data in parallel. Just as CPUs have developed from single processing units to multiple core processor that can execute instructions separately in each core, more recent GPUs provide "lanes" of vector computation, each of which can be interpreted as a separate thread.

A single hardware sequencer typically operates on a group of such threads in parallel. If all execute the same instruction, they are said to be coherent. A single instruction fetch is broadcast to all of the individual processing elements. If the threads branch in different directions, they are said to be diverged. The single instruction sequencer keeps track of which have diverged. It fetches a single instruction per cycle, and distributes it to all of those processing elements enabled by the mask.

FIG. 1 is a block diagram illustrating one embodiment of a graphics rendering system 100 that uses computing devices including CPUs and/or GPUs to perform parallel computing for applications. System 100 may implement a parallel computing architecture. In one embodiment, system 100 may be a graphics system including one or more host processors coupled with one or more CPUs 170 and one or more GPUs 180 through a data bus 190. The plurality of host processors may be networked together in a host system 110. The plurality of CPUs 170 may include multi-core CPUs from different vendors. A compute processor or compute unit, such as CPU or GPU, may be associated a group of capabilities. For example, a GPU may have dedicated texture rendering hardware. Another media processor may be a GPU supporting both dedicated texture rendering hardware and double precision floating point arithmetic. Multiple GPU s may be connected together.

In one embodiment, the host systems 110 may support a software stack. The software stack can include software stack components such as applications 120, compute application libraries 130, a compute platform layer 140, e.g. an OpenCL platform, a compute runtime layer 150, and a compute compiler 160. An application 120 may interface with other stack components through API calls. One or more processing elements or threads may be running concurrently for the application 120 in the host systems 110. The compute platform layer 140 may maintain a data structure, or a computing device data structure, storing processing capabilities for each attached physical computing device. In one embodiment, an application may retrieve information about available processing resources of the host systems 110 through the compute platform layer 140. An application may select and specify capability requirements for performing a processing task through the compute platform layer 140. Accordingly, the compute platform layer 140 may determine a configuration for physical computing devices to allocate and initialize processing resources from the attached CPUs 170 and/or GPUs 180 for the processing task.

The compute runtime layer 150 may manage the execution of a processing task according to the configured processing resources for an application 103, for example, based on one or more logical computing devices. In one embodiment, executing a processing task may include creating a compute program object representing the processing task and allocating memory resources, e.g. for holding executables, input/output data etc. An executable loaded for a compute program object may be a compute program executable. A compute program executable may be included in a compute program object to be executed in a compute processor or a compute unit, such as a CPU or a GPU. The compute runtime layer 109 may interact with the allocated physical devices to carry out the actual execution of the processing task. In one embodiment, the compute runtime layer 109 may coordinate executing multiple processing tasks from different applications according to run time states of each processor, such as CPU or GPU configured for the processing tasks. The compute runtime layer 109 may select, based on the run time states, one or more processors from the physical computing devices configured to perform the processing tasks. Performing a processing task may include executing multiple threads of one or more executables in a plurality of physical computing devices concurrently. In one embodiment, the compute runtime layer 109 may track the status of each executed processing task by monitoring the run time execution status of each processor.

The runtime layer may load one or more executables as compute program executables corresponding to a processing task from the application 120. In one embodiment, the compute runtime layer 150 automatically loads additional executables required to perform a processing task from the compute application library 130. The compute runtime layer 150 may load both an executable and its corresponding source program for a compute program object from the application 120 or the compute application library 130. A source program for a compute program object may be a compute program source. A plurality of executables based on a single compute program source may be loaded according to a logical computing device configured to include multiple types and/or different versions of physical computing devices. In one embodiment, the compute runtime layer 150 may activate the compute compiler 160 to online compile a loaded source program into an executable optimized for a target processor, e.g. a CPU or a GPU, configured to execute the executable.

An online compiled executable may be stored for future invocation in addition to existing executables according to a corresponding source program. In addition, the executables may be compiled offline and loaded to the compute runtime 150 using API calls. The compute application library 130 and/or application 120 may load an associated executable in response to library API requests from an application. Newly compiled executables may be dynamically updated for the compute application library 130 or for the application 120. In one embodiment, the compute runtime 150 may replace an existing compute program executable in an application by a new executable online compiled through the compute compiler 160 for a newly upgraded version of computing device. The compute runtime 150 may insert a new executable online compiled to update the compute application library 130. In one embodiment, the compute runtime 150 may invoke the compute compiler 160 when loading an executable for a processing task. In another embodiment, the compute compiler 160 may be invoked offline to build executables for the compute application library 130. The compute compiler 160 may compile and link a compute kernel program to generate a compute program executable. In one embodiment, the compute application library 130 may include a plurality of functions to support, for example, development toolkits and/or image processing. Each library function may correspond to a compute program source and one or more compute program executables stored in the compute application library 130 for a plurality of physical computing devices.

Various embodiments described herein provide a variety of useful features for manipulating scene graphs. These embodiments may be provided as an API for a graphics rendering system, typically in the form of a software developer's kit (SDK), but may be packaged in any way desired. The rendering system in one embodiment is customized for the hardware (CPUs and GPUs) that will be used for processing the graphics, allowing more efficient use of that hardware.

The sprites handled by the various embodiments may be rotated, sized, translated, scaled, moved, faded, and colored. Where sound is involved in the sprite, the sprite's sound may be played. Certain actions may be defined as waiting on an event before the action begins.

Autobatching

Faster frame rates are generally desirable over slow frame rates, particularly in applications such as games. The difference between a game running at 10 frames per second (fps) and one running at 60 fps is usually visually obvious and makes the game more enjoyable and playable. One way to achieve higher frame rates is to provide data for rendering to the GPU in larger chunks.

While some APIs have allowed a manual batching mode, in which draw calls are manually grouped together by the programmer, none have allowed auto-batching, in which the software tells the graphics API what to render, using a scene graph structure, and the rendering system behind the API automatically groups everything together and feeds the batch to the GPU.

Auto-batching allows feeding the GPU bigger chunks of data, which typically increases processing speed, resulting in an increased frame rate in the rendered graphics (for example, 60 fps v 10 fps). The API also allows for automatically determining the batching based on the GPU to be used, without the programmer having to have knowledge of the GPU or to perform the customization for that GPU. Because the API and underlying graphics libraries know exactly what hardware is available. For example, what GPU(s) and CPU(s) are available, the auto-batching API can batch things easier than conventional manual batching.

In operation, the programmer a scene graph in any desired way, then the graphics API analyzes the tree representing the scene graph, based on knowledge of the GPU(s) in use. The analysis allows the API to order the GPU draw calls to produce the desired result automatically, which may be in a different order than the user specified in the tree.

Figure 2:
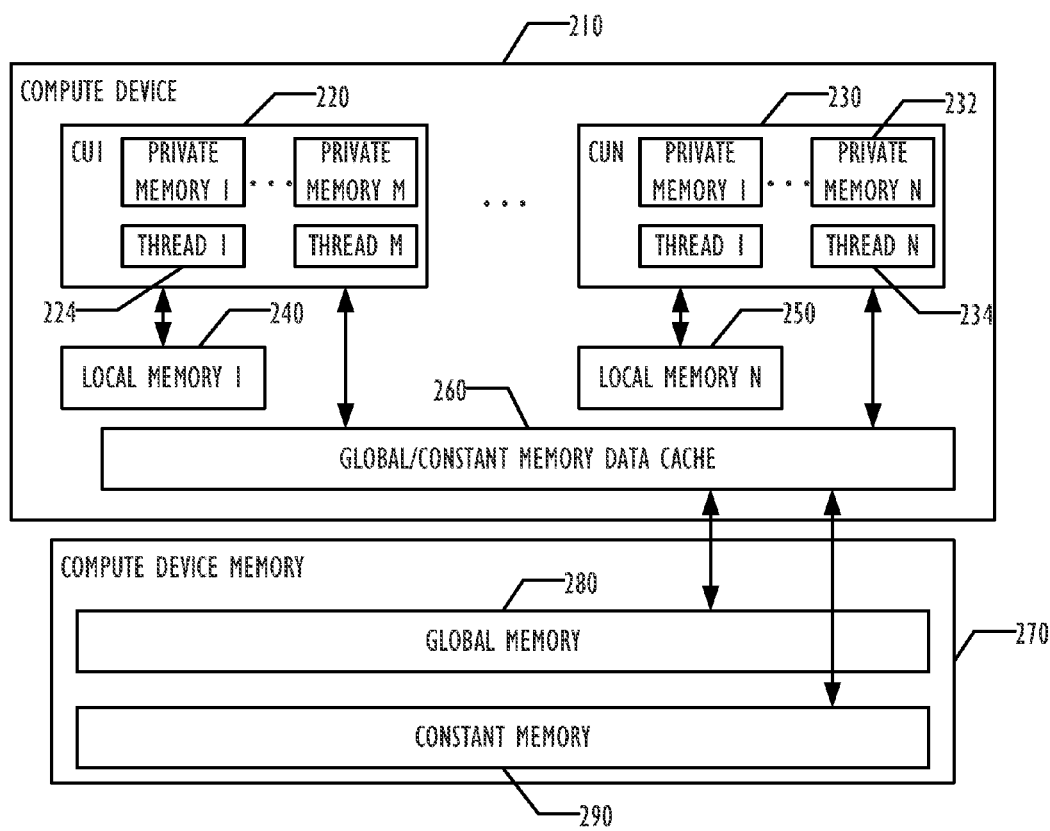
FIG. 2 is a block diagram illustrating an example of a computing device with multiple compute processors (e.g. compute units) operating in parallel to execute multiple threads concurrently.

FIG. 2 is a block diagram illustrating an example of a computing device with multiple compute processors (e.g. compute units) operating in parallel to execute multiple threads concurrently. Each compute processor may execute a plurality of threads in parallel (or concurrently). Threads that can be executed in parallel in a compute processor or compute unit may be referred to as a thread group. A computing processor may have multiple thread groups that may be executed in parallel. For example, M threads are shown to execute as a thread group in compute processor 220. Multiple thread groups, e.g. thread 1 of compute processor 1 220 and thread N of compute processor N 230, may execute in parallel across separate compute processors on one computing device 210 or across multiple computing devices 210. A plurality of thread groups across multiple compute processors may execute a compute program executable in parallel. More than one compute processors may be based on a single chip, such as an ASIC (Application Specific Integrated Circuit) device. In one embodiment, multiple threads from an application may be executed concurrently in more than one compute processors across multiple chips.

The computing device 210 may include one or more compute processors or compute units such as CPU 220 and CPU 230, which may be any combination of CPUs and GPUs. A local memory 240 may be coupled with a compute processor and shared among threads in a single thread group running in a compute processor. Multiple threads from across different thread groups, such as thread 1 224 and thread N 234, may share a compute memory object, such as a stream, stored in a computing device memory 270 coupled to the computing device 210. The computing device memory 270 may include a global memory 280 and a constant memory 290. The global memory 280 may be used to allocate compute memory objects, such as streams. A compute memory object may include a collection of data elements that can be operated on by a compute program executable. A compute memory object may represent an image, a texture, a frame-buffer, an array of a scalar data type, an array of a user-defined structure, or a variable, etc. The constant memory 290 may be read-only memory storing constant variables frequently used by a compute program executable.

In one embodiment, local memory for a compute processor or compute unit may be used to allocate variables shared by all threads in a thread group. The local memory may be implemented as a dedicated local storage, such as local shared memory 240 for CPU 220 and local shared memory 250 for GPU 230. In another embodiment, a local memory for a compute processor may be implemented as a read-write cache for a computing device memory for one or more compute processors of a computing device, such as data cache 260 for compute processors 220 and 230 in the computing device 210. A dedicated local storage may not be shared by threads across different thread groups. If the local memory of a compute processor, such as CPU 220 is implemented as a read-write cache, e.g. data cache 260, a variable declared to be in the local memory may be allocated from the computing device memory 270 and cached in the read-write cache, e.g. data cache 260, that implements the local memory. Threads within a thread group may share local variables allocated in the computing device memory 270 when, for example, neither a read-write cache 260 nor dedicated local storage 240, 250 are available for the corresponding compute processor 220, 230. In one embodiment, each thread may be associated with a private memory to store thread private variables that are used by functions called in the thread. For example, private memory N 232 may not be seen by threads other than thread N 234.

Figure 3:
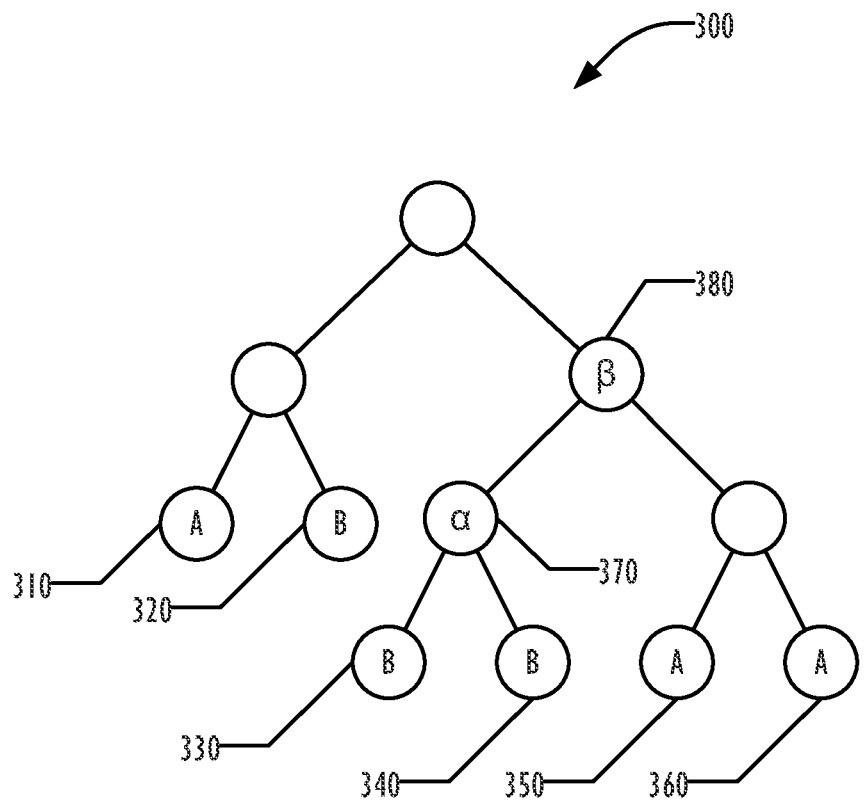
FIG. 3 is a graph of a tree representing a simple scene graph.

FIG. 3 is a graph 300 of a tree representing a simple scene graph which involves three renderings of a first sprite (identified as "A" in FIG. 3) and three renderings of a second sprite (identified as "B" in FIG. 3). The graph 300 implicitly defines an order for the GPU draw calls of 310, 320, 330, 340, 350, and 360, resulting in rendering A, B, B, B, A, and A. As the API receives the information, that would generate six GPU draw calls. A programmer might recognize that the three consecutive renderings of B could be consolidated into a single draw call, and the final two renderings of A could be batched or consolidated into a single draw call, resulting in three draw calls. But the auto-batching technique of an API as disclosed herein may be able to improve on the manual batching, based on the knowledge of the GPU hardware available. Certain GPUs may allow more consolidation than other GPUs, and manual batching would require the programmer to customize the software for a desired GPU, or to write custom code to account for various GPUs. By moving that activity into the API, the programmer is freed from that customization, and the complexity of the application can be correspondingly reduced.

In one application, using a first GPU, the auto-batching may be able to consolidate the draw calls 310, 350, and 360 into a single draw call to render A, and draw calls 320, 330, and 340 into a single draw call to render B, resulting in only 2 actual draw calls to the GPU. In another application, where the GPU is capable of generating a single texture from a union of trees, the API may be able to reduce the number of GPU draw calls to a single draw call that is a union of A and B, resulting in a single texture of the union plus offsets. For example, draw call 310 renders A at a different location in the scene than draw call 350. Thus, offsets are calculated by the rendering system that allow displaying the rendered sprite A at both locations, without having to re-render sprite A. By auto-batching the draw calls, therefore, the same resulting scene may be displayed as a frame, but with reduced GPU activity, potentially allowing increased frame rates.

Figure 4:
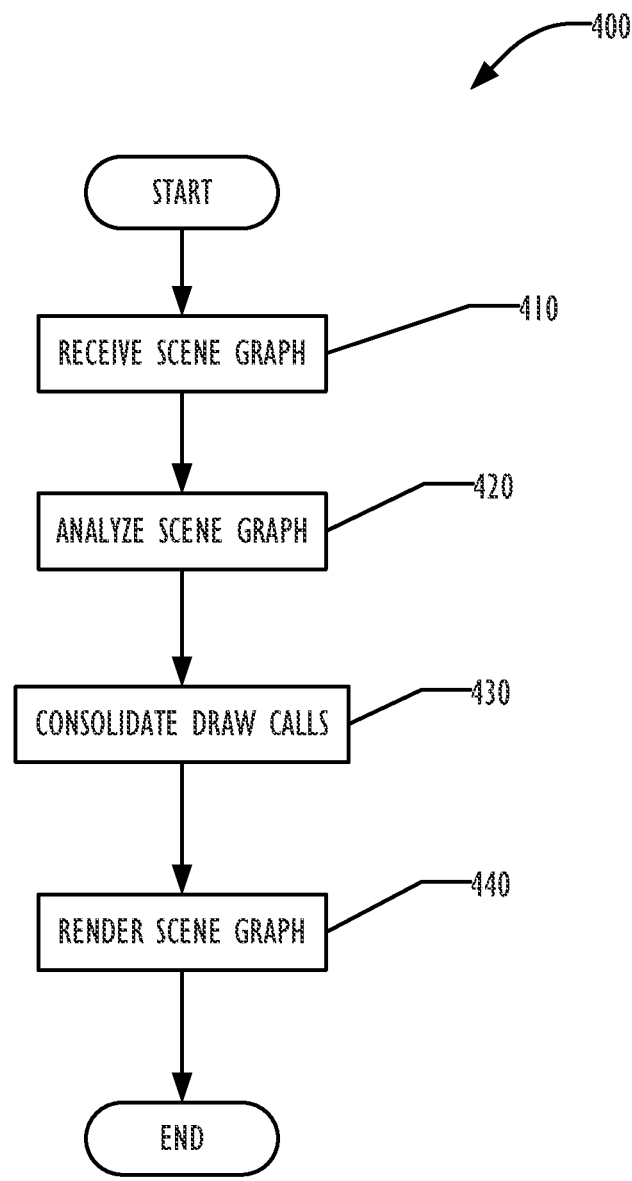
FIG. 4 is a flowchart illustrating an auto-batching technique according to one embodiment.

The auto-batching technique is illustrated in the flowchart of FIG. 4. In block 410, the scene graph is received from the application. The scene graph is analyzed in block 420, in view of the characteristics and capabilities of the GPU to be used. In block 430, the draw calls of the implicit ordering of the graph are consolidated as much as possible by sorting the scene graph of each frame based on the analysis. Finally, in block 440, the scene graph is rendered.

Figure 5:
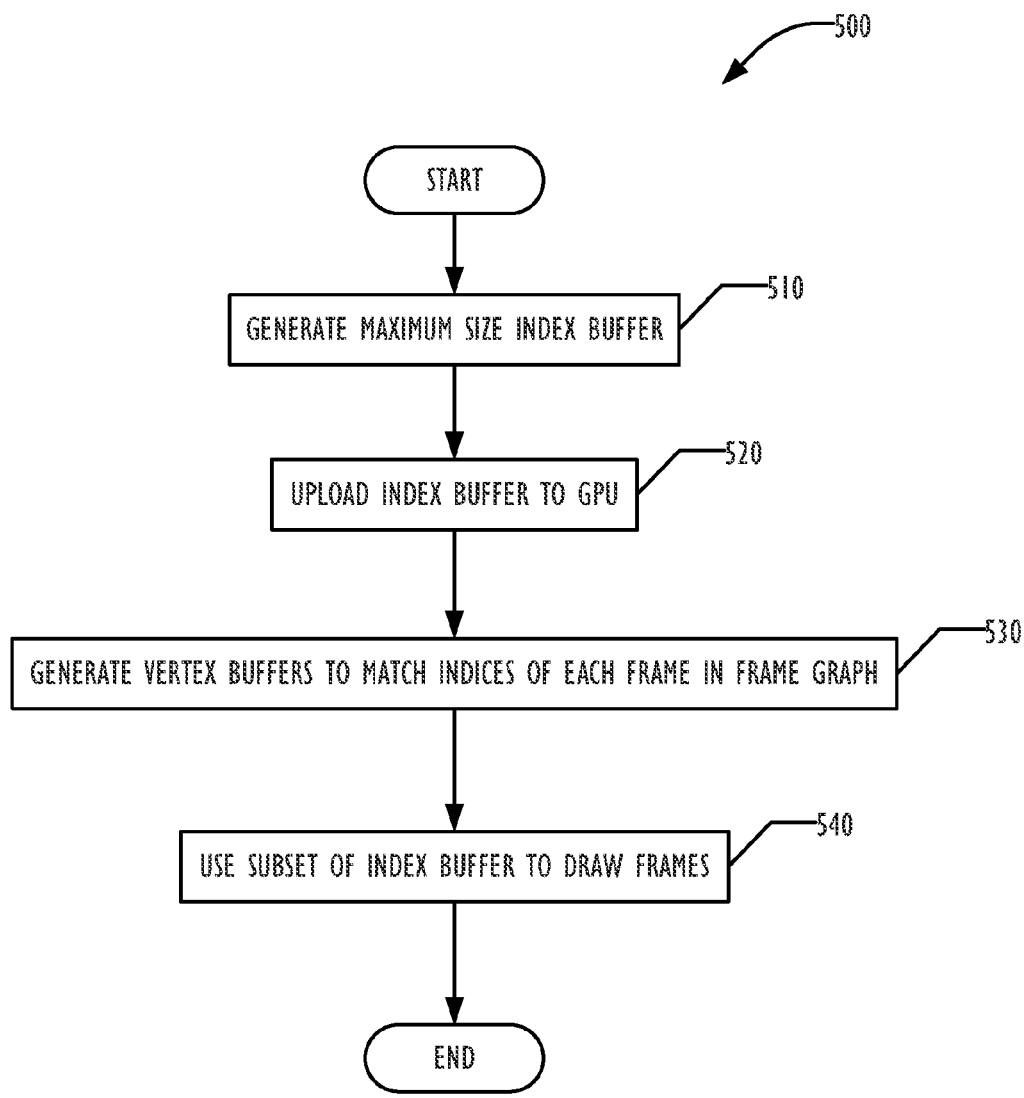
FIG. 5 is a flowchart illustrating a technique for using index buffers and vertex buffers according to one embodiment.

The technique involves the use of index buffers and vertex buffers for data management in GPU memory, as illustrated in the flowchart of FIG. 5. On loading the application generating the graphics frames, the API pre generates a maximum length index buffer in block 510, filling it with static indices. The index buffer is uploaded to the GPU once in block 520, and then a subset of the buffer is reused to draw each frame. In one embodiment, all drawings are in the form of quadrilaterals composed of two triangles with shared vertices. The vertex buffers are generated in block 530 to match the indices of each frame based on the state of the scene graph. As vertices are updated, the vertex buffer can be updated as well, so that the index buffer entry continues to reference the correct vertex structure.

In one embodiment, a draw call is expressed as

Drawcall(Texture, List of Vertices)

Each vertex is a structure with (x, y, z, color, texture_position). The vertices are stored in GPU memory in the vertex buffer once. However, the "list of vertices," instead of sending vertices in the draw call, sends indices into vertex buffer. The index buffer is supplied to the GPU such that an index buffer entry is an index into the vertex buffer.

In one embodiment, the index buffer entries are offsets into the vertex buffer. Alternately, the index buffer entries may simply be numbers. Thus, an index buffer entry of 2 would indicate the second entry into the vertex buffer and a draw call with a list of vertices of "1, 3, 2" would reference the first, third, and second vertices in the vertex buffer. In such an embodiment, index buffer entries may be small values, such as 16-bit integers, which are typically smaller than the size of a vertex entry in the vertex buffer.

Texture Effects, Auto Rasterization.

In one embodiment, the API allows for caching for what would be extremely expensive effects, then reusing those cached effects, reducing processing time and speeding the rendering process. Such cached texture effects can be very useful with dealing with Core Image effects that would be otherwise expensive in time and processing resources.

An "effect node" can be placed anywhere in the scene graph. The effect node flattens all of its children into a cached texture. The effect node automatically detects when any of its children have changed and regenerates the rasterized texture. If nothing has changed, the effect node can be automatically redrawn using the cached texture without spending any time redrawing the children. Effectively, the effect node substitutes for the entire subtree rooted at that point in the scene graph.

A texture effect or "CI Filter" can also be applied to the effect node. This includes complex effects like Bloom, Gaussian Blur, Warping and Smudging. These operations are often expensive to compute every frame so the rendering systems caches the output of the effect applied to the effect node and then use that to perform extremely fast rendering when nothing below the effect node has changed. In one embodiment, multiple effect nodes can be cached with different effects applied to an underlying texture.

Figure 6:
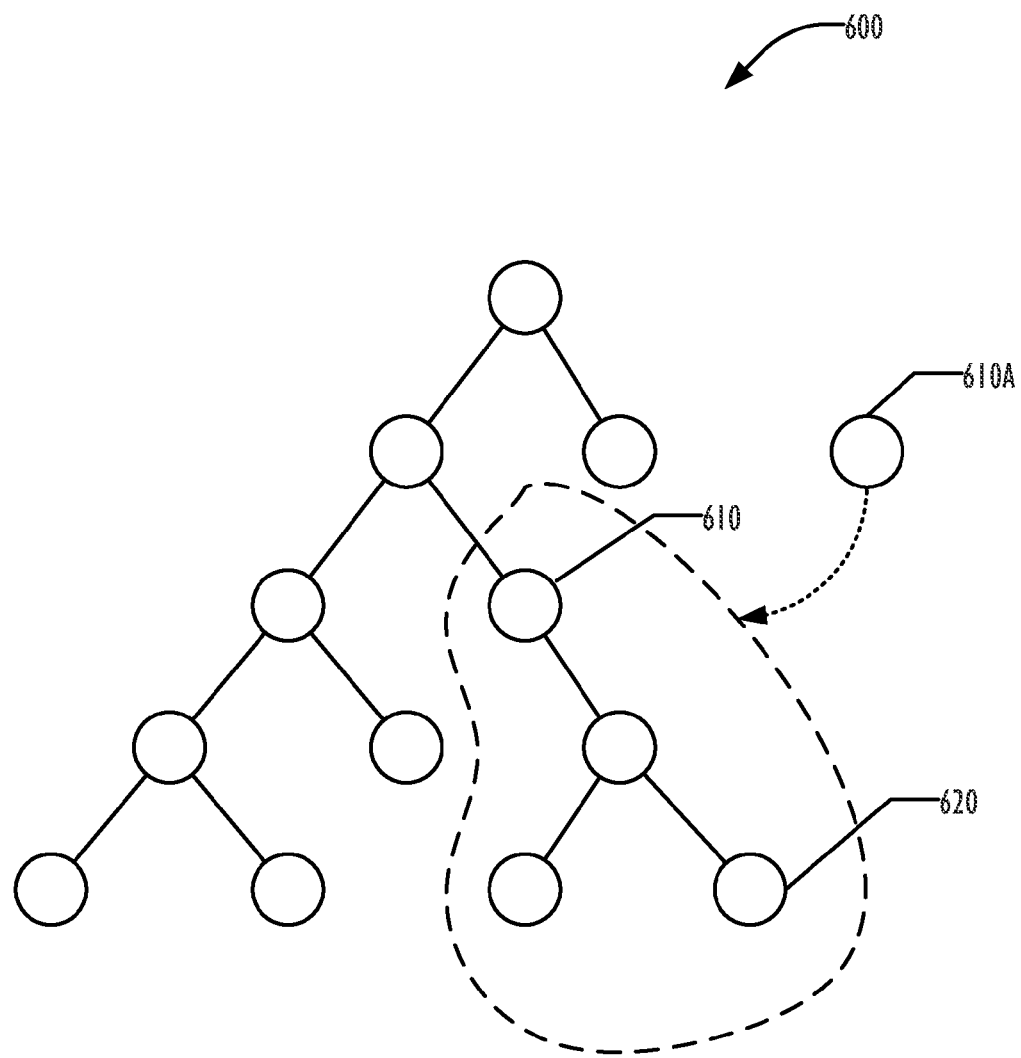
FIG. 6 is a graph illustrating a simple scene graph in which a subtree is replaced by an effects node according to one embodiment.

FIG. 6 is a graph 600 illustrating a simple scene graph. An effect node 610A can be generated to replace the entire subtree rooted at node 610 of the scene graph. The effect node 610A incorporates a texture generated from the subtree (illustrated outlined with a dashed line in FIG. 6) so that effects node 610A can be manipulated as a unit. An effect node is a special scene graph node that is flattened and caches everything below it in the scene graph as a fixed texture. The effects node 610A may be recomputed if node 620 or anything else in the subtree below it changes. This allows the use of expensive CI Filters, because the output of the CI Filter can be cached as part of the effects node.

Figure 7:
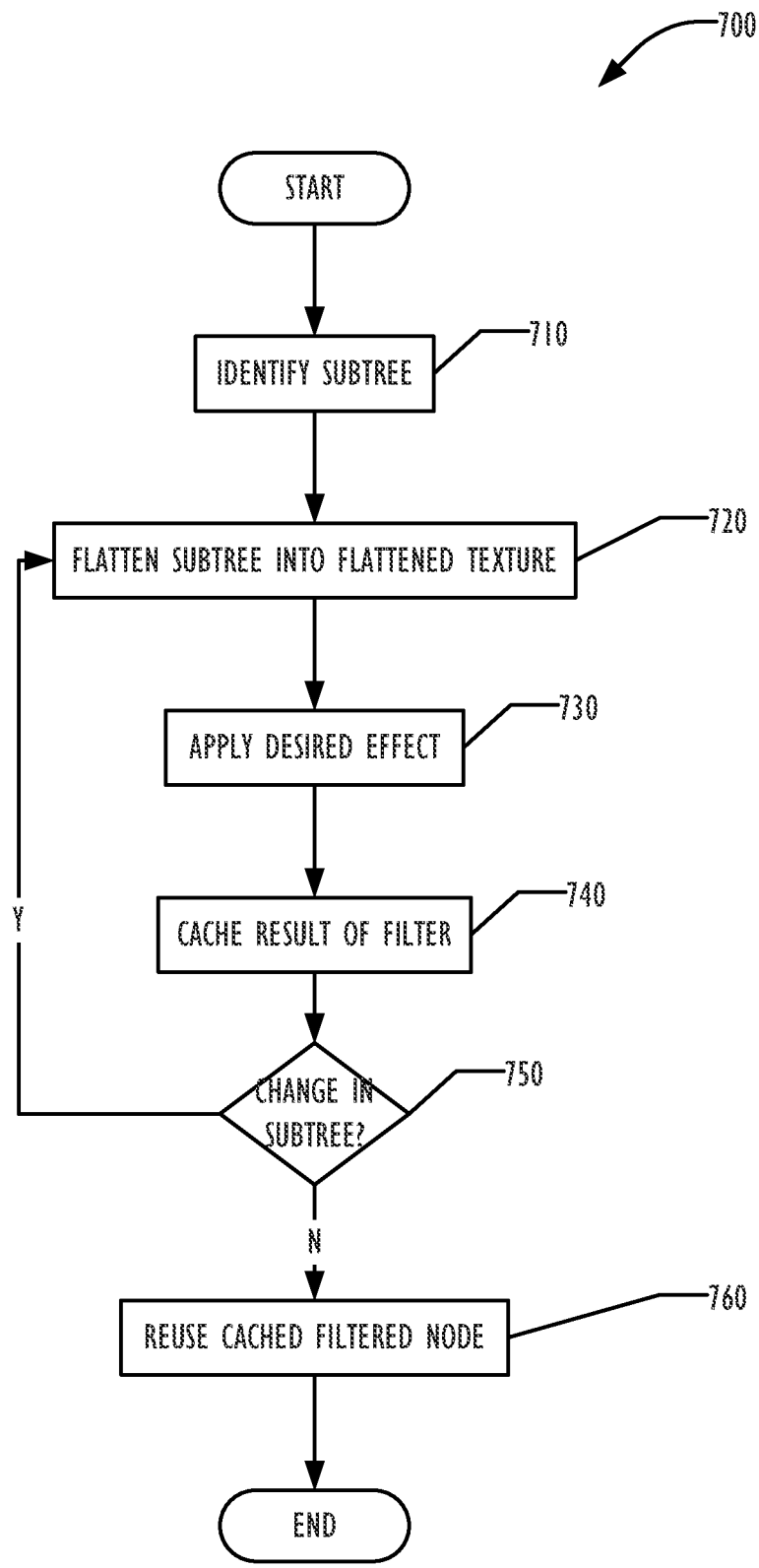
FIG. 7 is a flowchart illustrating a technique for generating effects nodes according to one embodiment.

FIG. 7 is a flowchart 700 illustrating a technique for generating effects nodes according to one embodiment. In block 710, the subtree of the scene graph to be converted to an effects node is identified, such as the subtree rooted at block 610 of FIG. 6. In block 720, the subtree is flattened into a flattened texture. The flattened texture is typically cached in GPU memory, but may be stored in application memory. If an effect or filter is to be applied to the effects node, the effect is applied in block 730 and the result is cached in block 740. In one embodiment, the flattened texture is also cached, so that if a different effect is desired to be applied to the effects node, the cached effects node can be used for applying the effect, instead of having to flatten the entire subtree again.

In block 750, if any change in the subtree occurs, such as a change to node 620 as illustrated in FIG. 6, the procedure can be repeated starting in block 720. Otherwise, in block 760 the cached filtered node can be reused when needed, instead of having to render the subtree and apply the filter.

Texture Reuse and Preloading

Texture take up valuable memory on the GPU and a developer will often use the same texture in different places. In conventional rendering systems, if a texture is loaded from a file a first time, then reloaded later, two copies of the texture are stored in GPU memory, taking up valuable space.

In one embodiment, the rendering system manages textures in GPU memory. This may involve texture reuse. When the programmer indicates an image to use, the system manages it in GPU memory. The programmer can also indicate that a texture is no longer to be used, allowing the system to remove the texture from GPU memory. By managing textures in GPU memory, the system can guarantee that there is only a single copy of any image in GPU memory.

The rendering system can keep a single cached copy of the texture resident in the GPU memory and automatically redirect all future use to that single shared instance. In one embodiment, the system may also detect when the resource has not been used for a predetermined time (or number of draw calls) and free up the memory.

The cached texture may also be stored to a file on a disc drive. If the cached texture is removed from the cache, but is used later, the rendering system can automatically reload the resource from disc, completely transparent to the user.

Although described above as managing textures in GPU memory, any resource that is stored in GPU memory may be managed and cached as indicated above.

The disclosed techniques pre-process or analyze a scene graph tree. Resources can be pre-fetched before they are needed, caching the pre-fetched resource. The auto-batching techniques described above may also be used to send an optimal sequence to the GPU for rendering the scene, possibly reducing the number of times a texture must flushed from the GPU memory cache.

As illustrated in FIG. 3 in one embodiment the graph 300 is analyzed to identify dependencies in the graph, such as the need to render node 370 before node 380. The rendering system can then optimize passing the scene to the GPU to reduce cache flushing and other efficiency-degrading situations.

Automatic Texture Atlas

Tools exist to allow developers to refer to textures by name, creating a texture atlas that maps names to textures. However, those tools are not automatic, and do not provide memory management capabilities as described above. In one embodiment, an automatic texture atlas capability transparently creates a texture atlas.

Figure 8:
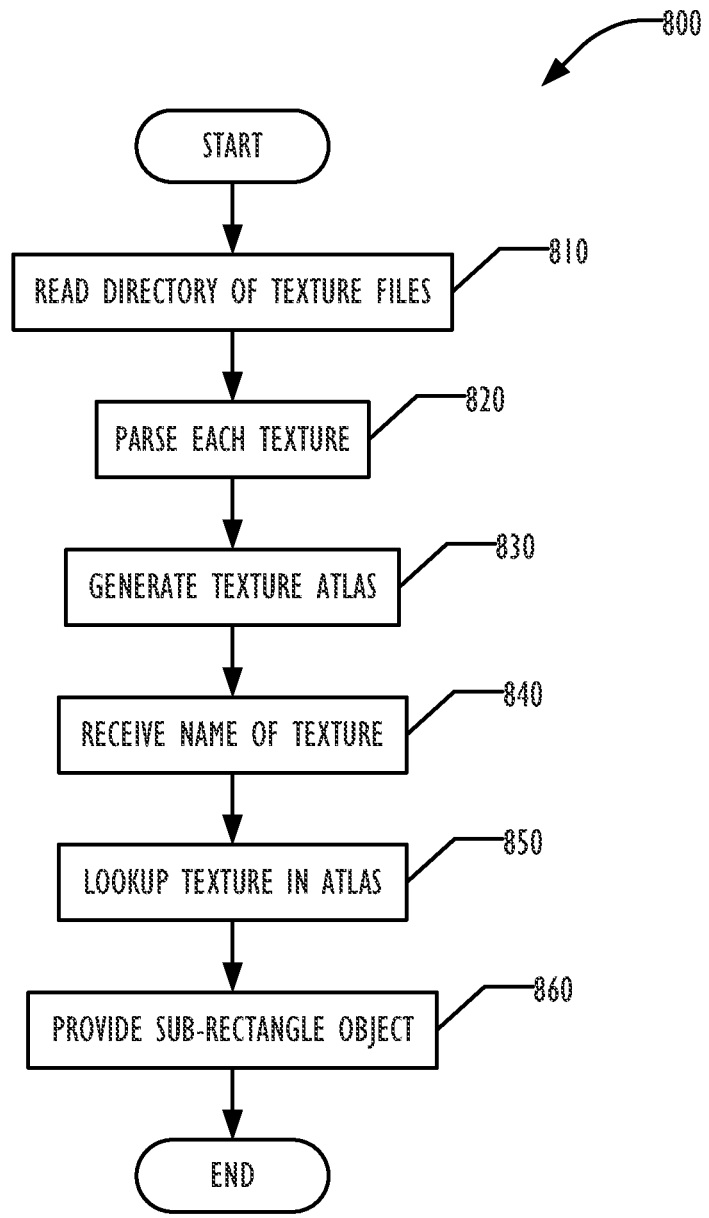
FIG. 8 is a flowchart illustrating a technique for automatically generating a texture atlas according to one embodiment.

Developers in one embodiment can run a single automation tool as illustrated in FIG. 8 by flowchart 800 that takes a directory of texture files (PNG, JPG, TIFF etc.) in block 810, parses each individual texture in block 820, and generates a texture atlas in block 830 (typically as a single JPG or PNG, but in any desired format), along with a manifest file in XML format that records the texture coordinates and dimensions in the texture atlas. Later, when the rendering system receives the name of the texture as specified by the developer in block 840, in block 850 a lookup occurs to find the desired texture, and finally in block 860 to provide the sub-rectangle of the atlas with the desired texture.

The developer may then request the image by name which is received in block 840. The graphics system locates the atlas file, loads it into the GPU, looks up the texture in the atlas in block 850, then provides an object representing the sub-rectangle of the atlas which contains the original image data in block 860.

Using Arrays Inside Arrays to Mean Groups in Sequences etc.

Animations include actions like scaling, movement, fading, timed wait, rotation, etc. In addition, each of these building blocks can be placed into either a "Group" animation (parallel) or a "Sequence" animation (sequential). The groups and sequences themselves can also be placed within other groups/sequence to create complex animations.

In one embodiment, using the Objective C syntax for defining arrays provides an intelligent way to interpret nested animations supplied by the user. When defining a sequence of actions, if one of the elements is itself another array of actions, that sub-array is then treated as a group (parallel) within the sequence. Similarly if one of the elements of a group of actions is itself another array of actions, that sub-array is then treated as a sequence within the group.

For example, if an animation is defined as an array of three actions:
Animation=[Move, Scale, Remove]
And the scale action is defined as an array of three actions:
Scale=[Scale, Boing]
Then the animation may be interpreted as $$\text{Animation} = \left[\text{Move}, \left[\frac{\text{scale}}{\text{boing}}\right], \text{Remove}\right]$$

Where the scale and boing actions are performed in parallel.

Serialization of the Scene Graph at any Point in Time

A unique feature of embodiments of the rendering system is that the entire scene graph can be serialized to memory or a data file at any point in time. This includes the exact state of all nodes in the scene and any animations that may have been applied to them. This file can then be loaded at a later time as a means of debugging a specific issue or even as a deployment mechanism to deliver and share game content with a single line of code. The serialization can also be used for memory conservation: after serialization to a file, the scene graph may be removed from memory until needed, when the serialized scene graph is reloaded from the file.

Aspect handling, scaling to fit with accurate pixel rendering avoiding artifacts In one embodiment, the rendering system automatically detect the pixel density and aspect ratio of the display on which the graphics will be rendered. Using that information, the rendering system may select between versions of artwork to provide the best possible artwork available for that display. The rendering system may also scale the artwork to match the screen resolution using an aspect-fit, aspect-fill, or resize algorithm.

Masking Using a Scene Graph as Input

Figure 9:
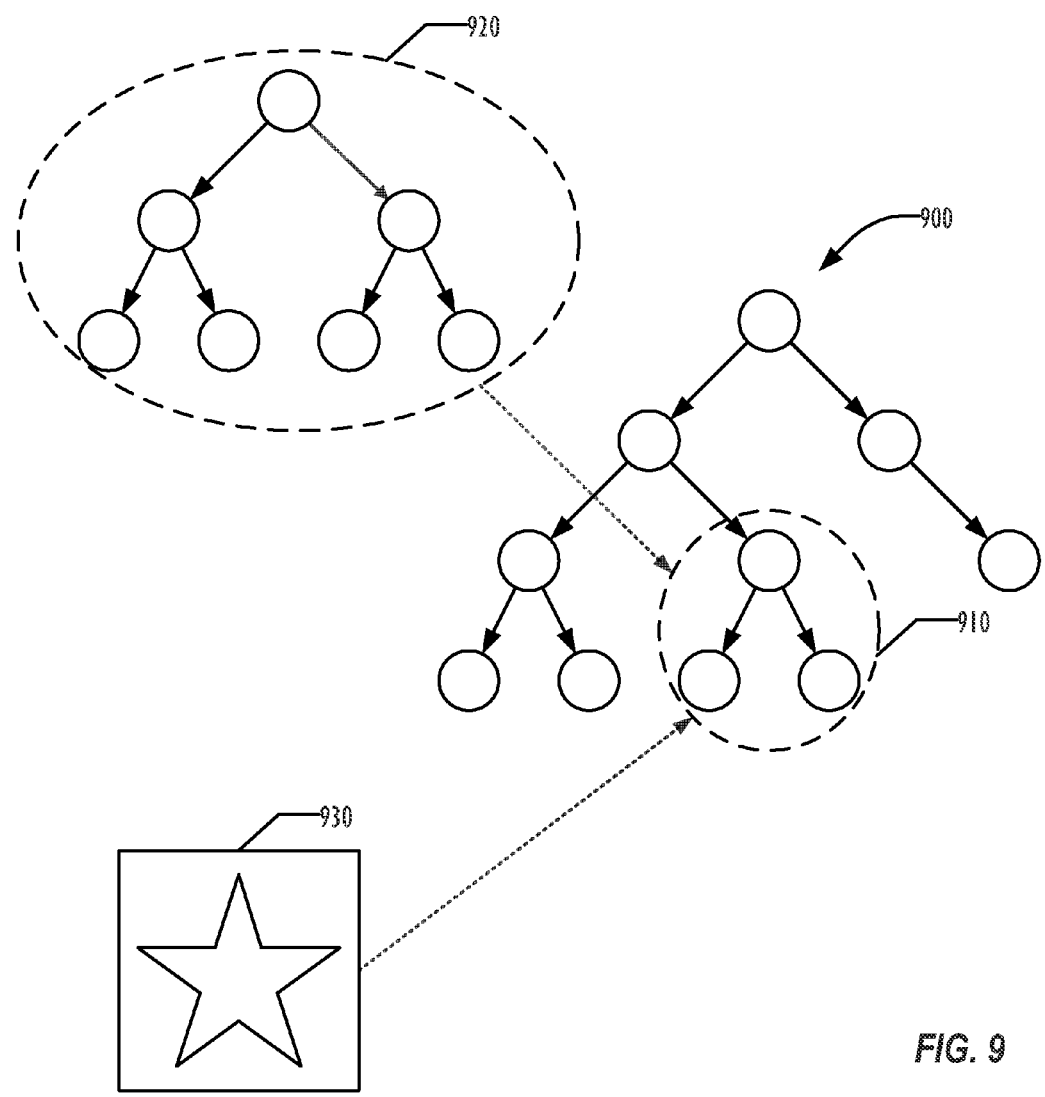
FIG. 9 is a graph illustrating an example scene graph and two ways of masking a subtree of the scene graph according to one embodiment.

In one embodiment of the rendering system, masking is extremely flexible. Any subtree of the scene graph can be used as the item to be masked, and any other subtree of the scene graph can be used as the mask. FIG. 9 is a graph 900 illustrating an example scene graph and two ways of masking subtree 910. Conventionally, masking is done via a single input image as the mask, such as the star element 930. But in addition, anything in the scene graph 900 can be used as the mask, including game characters, particle systems like fire, videos, geometrical shapes, etc. In the example of FIG. 9, the subtree 910 can also be masked by the subtree 920.

Clipping, Culling and Masking Techniques Used

Figure 10:
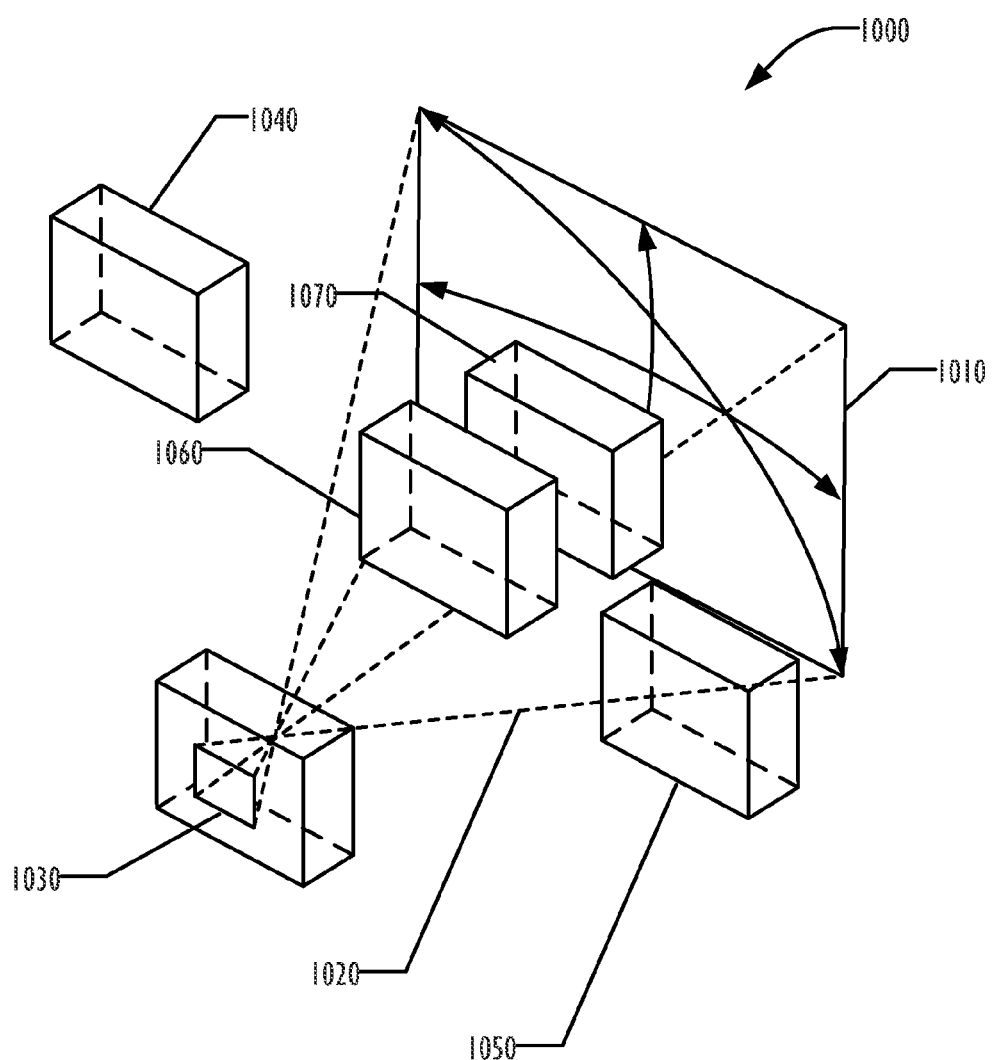
FIG. 10 is a block diagram illustrating a view frustum for a rendering system according to one embodiment.

FIG. 10 is a block diagram illustrating a viewing system 1000 with a view frustum 1020 defined by a plane 1010 and a viewport 1030. Anything outside the view frustum 1020 is not visible from the viewport 1030. Before passing the rendering geometry to the GPU, embodiments of the rendering system may perform a high level culling, to cull rendering objects or parts of rendering objects that would not be visible in the current view frustum 1020. The culling removes any rendering object off the draw call if the rendering object is not inside of the current view frustum 1020, such as the rendering object 1040. Where a rendering object is only partially within the view frustum 1020, such as rendering object 1050, only that part of the rendering object will be retained in the draw calls sent to the GPU by the rendering system. In one embodiment, the rendering system analyzes the scene graph tree and also removes back face or blocked geometries, such as the back face of opaque element 1060 and at least a portion of element 1070, which is blocked by rendering object 1060 from the point of view of the viewport 1030.

In one embodiment, a stencil buffer is used for masking, which is much faster than the traditional alpha masking technique. A stencil buffer is typically not used in 2D games. The rendering system uses a depth buffer, a color buffer, and a stencil buffer. The color buffer is what is seen when the rendered object is displayed, and may be 8, 16, 24, or any other number of bits per pixel.

Figure 11:
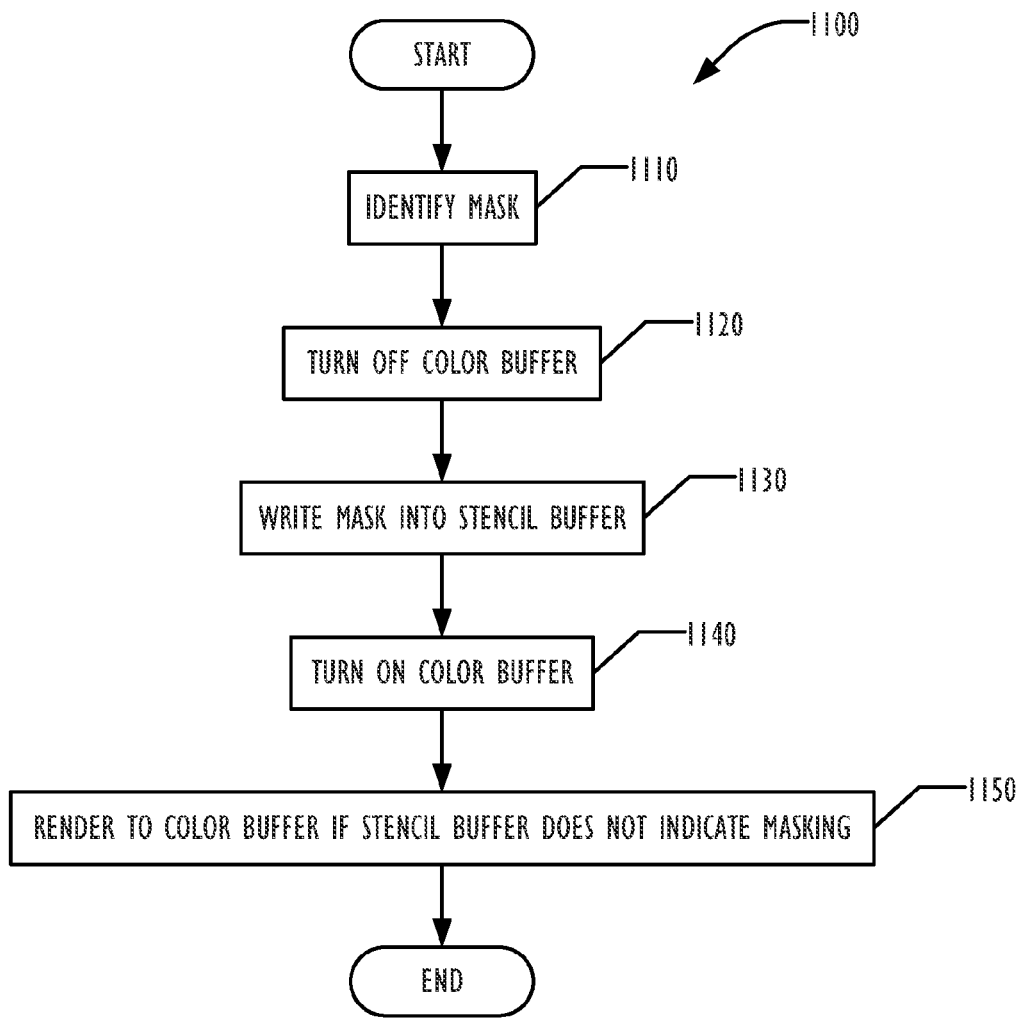
FIG. 11 is a flowchart illustrating a technique for masking using a stencil buffer according to one embodiment.

FIG. 11 is a flowchart illustrating a technique 1100 for masking using the stencil buffer according to one embodiment. In block 1110, a mask is identified by the rendering system, such as an object closer in a Z-direction to the viewport 1030. In block 1120, the color buffer is turned off. The mask is then written in block 1130 into the stencil buffer. In one embodiment, a single bit of an 8-bit stencil buffer element is used to indicate masking. The color buffer is then turned back on in block 1140 and rendering of the tree begins. The rendering system issues GPU draw calls that instruct the rendering system to render the color buffer only if the corresponding bit in the stencil buffer is not set.

Scene Graph Hierarchy Mapping to Physics Joints

The rendering system combines the rendering objects and physics objects together. To the end user, there is a single object that represents both on-screen rendering sprite and the physics rigid body. The physics rigid body information allows applying gravity, mass, acceleration, and velocity to individual sprites.

The rendering system maps and correlates the rendering coordinates and the physics world coordinate together. Once the physics is updated, the new position of the sprite is automatically updated as well. When a child of the object is added, the rendering system automatically creates a physics joint between the child object and its parents, so the parent and child physics properties are maintained in hierarchy.

Implementation in an Electronic Device

Figure 12:
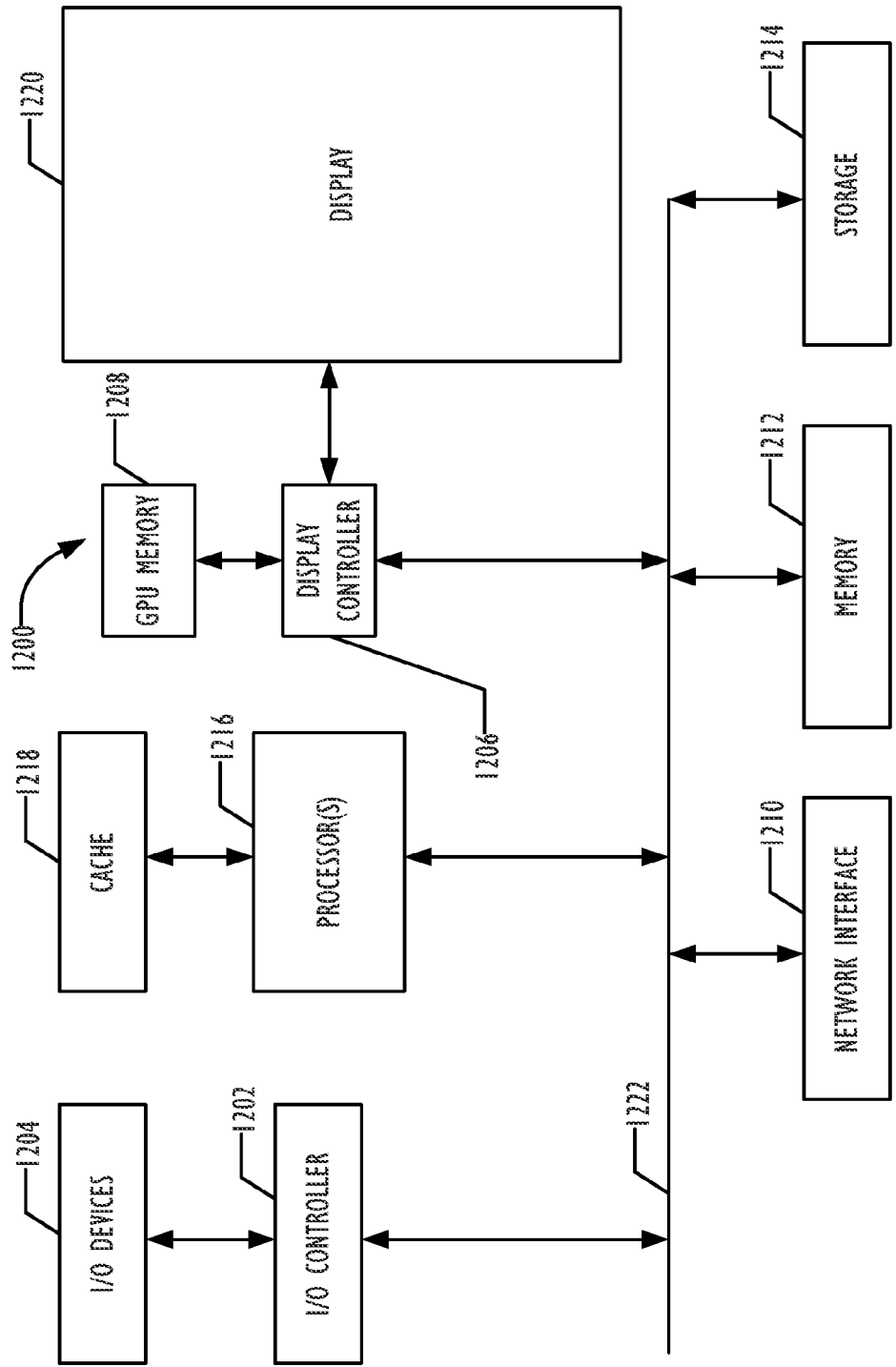
FIG. 12 is a block diagram of a computer system for use with a rendering system according to one embodiment.

FIG. 12 shows one example of a computer system 1200 that can be used with one embodiment. For example, the system 1200 may be implemented as a part of the systems shown in FIG. 1. While FIG. 12 illustrates various components of a computer system, it is not intended to represent any particular architecture or manner of interconnecting the components as such details are not germane to the present disclosure. Network computers and other data processing systems (for example, handheld computers, personal digital assistants (PDAs), cellular telephones, entertainment systems, consumer electronic devices, etc.) which have fewer components or perhaps more components may also be used to implement one or more embodiments.

As shown in FIG. 12, the computer system 1200, which is a form of a data processing system, includes a bus 1222 which is coupled to a microprocessor(s) 1216, which may be CPUs and/or GPUs, a memory 1212, which may include one or both of a volatile read/write random access memory (RAM) and a read-only memory (ROM), and a non-volatile storage device 1214. For example, memory 1212 may include at least one non-transitory computer readable medium and/or non-transitory computer readable storage medium. The microprocessor(s) 1216 may retrieve instructions from the memory 1212 and the storage device 1214 and execute the instructions using cache 1218 to perform operations described above. The bus 1222 interconnects these various components together and also interconnects these components 1216, 1218, 1212, and 1214 to a display controller 1206 and display device 1220 and to peripheral devices such as input/output (I/O) devices 1204 which may be mice, keyboards, modems, network interfaces, printers and other devices which are well known in the art. Typically, the input/output devices 1204 are coupled to the system through input/output controllers 1202. Where volatile RAM is included in memory 1212, the RAM is typically implemented as dynamic RAM (DRAM) which requires power continually in order to refresh or maintain the data in the memory. The display controller 1206 and display device 1220 may optionally include one or more GPUs to process display data. Optionally, a GPU memory 1208 may be provided to support GPUs included in the display controller 1206 or display device 1220.

The storage device 1214 is typically a magnetic hard drive, an optical drive, a non-volatile solid-state memory device, or other types of memory systems which maintain data (e.g. large amounts of data) even after power is removed from the system. For example, the storage device 1214 may include at least one non-transitory computer readable medium and/or a non-transitory computer readable storage medium that maintain data even after power is removed from the system. While FIG. 12 shows that the storage device 1214 is a local device coupled directly to the rest of the components in the data processing system, embodiments may utilize a non-volatile memory which is remote from the system, such as a network storage device which is coupled to the data processing system through a network interface 1210, which may be a wired or wireless networking interface. The bus 1222 may include one or more buses connected to each other through various bridges, controllers and/or adapters as is well known in the art. Although only a single element of each type is illustrated in FIG. 12 for clarity, multiple elements of any or all of the various element types may be used as desired.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory computer-readable storage medium, comprising instructions that when executed cause one or more processors to:
    cache a texture in a first memory associated with a graphics processor;
    automatically update a texture atlas to identify the cached texture, wherein the cached texture maps to a searchable name; and
    automatically reload the cached texture when rendering a scene graph by the graphics processor without creating a copy of the cached texture within the first memory, wherein the instructions to automatically reload the cached texture comprises instructions that cause the one or more processors to:
        receive a request for an image, wherein the request includes the searchable name;
        reference the cached texture by the searchable name;
        perform a lookup with the searchable name to obtain coordinates and dimensions of the cached texture from the texture atlas; and
        provide, in response to the received request, a sub-rectangle of the texture atlas corresponding to the coordinates and the dimensions of the cached texture.

2. The non-transitory computer-readable storage medium of claim 1, wherein the instructions further cause the one or more processors to:
    remove the cached texture from the first memory automatically;
    cache the texture in a storage medium; and
    reload the texture from the storage medium into the first memory automatically.

3. The non-transitory computer-readable storage medium of claim 1, wherein the instructions further cause the one or more processors to:
    generate the texture from a flattened subtree of a scene graph;
    insert a node associated with the texture into the scene graph; and
    render the cached texture instead of rendering the subtree.

4. The non-transitory computer-readable storage medium of claim 3, wherein the instructions further cause the one or more processors to:
regenerate the texture responsive to a change in the subtree; and
re-cache the regenerated texture in the first memory.

5. The non-transitory computer-readable storage medium of claim 3, wherein the instructions further cause the one or more processors to:
generate a second texture by applying an effect to the cached texture; and
cache the second texture in the first memory.

6. The non-transitory computer-readable storage medium of claim 1, wherein the instructions further cause the one or more processors to automatically remove the cached texture from the first memory.

7. The non-transitory computer-readable storage medium of claim 6, wherein the instructions to automatically remove the cached texture comprise instructions that cause the one or more processors to:
detect whether the cached texture has not been used within a predetermined time; and
remove the cached texture from the first memory based on the determination that the cached texture has not been used within a predetermined time.

8. The non-transitory computer-readable storage medium of claim 6, wherein the instructions to automatically remove the cached texture comprise instructions that cause the one or more processors to:
detect whether the cached texture has not been used within a number of draw calls; and
remove the cached texture from the first memory based on the determination that the cached texture has not been used within the number of draw calls.

9. The non-transitory computer-readable storage medium of claim 1, wherein the instructions further cause the one or more processors to:
automatically identify a plurality of texture files;
automatically parse the texture files to generate the texture atlas; and
automatically parse a manifest file to record a plurality of texture coordinates and a plurality of dimensions associated with the texture files in the texture atlas.

10. The non-transitory computer-readable storage medium of claim 1, wherein the instructions further cause the one or more processors to serialize the scene graph into a storage medium or a data file.

11. A method for rendering graphics, comprising:
caching a texture in a memory associated with a graphics processor;
automatically updating a texture atlas to include the cached texture, wherein the cached texture maps to a searchable name; and
automatically reloading the cached texture while rendering a scene graph by the graphics processor without creating a copy of the cached texture within the first memory, wherein automatically reloading the cached texture comprises:
receiving a request for an image, wherein the request includes the searchable name;
referencing the cached texture by the searchable name received from the request;
performing a lookup with the searchable name to obtain coordinates and dimensions of the cached texture in the texture atlas; and
providing, in response to the received request, a sub-rectangle of the texture atlas corresponding to the coordinates and the dimensions of the cached texture.

12. The method of claim 11, further comprising:
remove the cached texture from the first memory automatically;
caching the texture in a storage medium; and
reloading the texture from the storage medium into the memory automatically.

13. The method of claim 11, further comprising:
generating the texture from a flattened subtree of a scene graph;
inserting a node associated with the texture into the scene graph; and
rendering the cached texture instead of rendering the subtree.

14. The method of claim 13, further comprising:
regenerating the texture responsive to a change in the subtree; and
re-caching the regenerated texture in the first memory.

15. The method of claim 13, further comprising:
generating a second texture by applying an effect to the cached texture; and
caching the second texture in the first memory.

16. The method of claim 11, further comprising automatically removing the cached texture from the first memory.

17. The method of claim 11, further comprising:
automatically identifying a plurality of texture files;
automatically parsing the texture files to generate the texture atlas; and
automatically parsing a manifest file to record a plurality of texture coordinates and a plurality of dimensions associated with the texture files in the texture atlas.

18. A system comprising:
one or more processors;
memory coupled to the one or more processors, wherein the memory stores instructions when executed by the one or more processors, causes the one or more processors to:
cache a texture in a first memory associated with a graphics processor;
automatically update a texture atlas that identifies the cached texture, wherein the cached texture maps to a searchable name; and
automatically reload the cached texture when rendering a scene graph by the graphics processor without creating a copy of the cached texture within the first memory, wherein the instructions to automatically reload the cached texture comprises instructions that cause the one or more processors to:
receive a request for an image, wherein the request includes the searchable name;
reference the cached texture by the searchable name;
perform a lookup with the searchable name to obtain coordinates and dimensions of the cached texture associated with the texture atlas; and
provide, in response to the received request, a sub-rectangle of the texture atlas corresponding to the coordinates and the dimensions of the cached texture.

19. The system of claim 18, wherein the instructions further cause the one or more processors to:
remove the cached texture from the first memory automatically;
cache the texture in a storage medium; and reload the texture from the storage medium into the first memory automatically.

20. The system of claim 18, wherein the instructions further cause the one or more processors to:
automatically identify a plurality of texture files;
automatically parse the texture files to generate the texture atlas; and
automatically parse a manifest file to record a plurality of texture coordinates and a plurality of dimensions associated with the texture files in the texture atlas.

* * * * *